(12) United States Patent
Bateman

(10) Patent No.: US 7,844,905 B2
(45) Date of Patent: Nov. 30, 2010

(54) INFORMATION DISPLAY SYSTEM

(76) Inventor: Michael Bateman, 30602 Woodhue Ct., Spring, TX (US) 77386

( * ) Notice: Subject to any disclaimer, the term of this patent is extended or adjusted under 35 U.S.C. 154(b) by 1143 days.

(21) Appl. No.: 11/393,277

(22) Filed: Mar. 30, 2006

(65) Prior Publication Data

US 2006/0224941 A1 Oct. 5, 2006

Related U.S. Application Data

(60) Provisional application No. 60/667,004, filed on Mar. 31, 2005.

(51) Int. Cl.
*G06F 3/00* (2006.01)
*G06F 3/14* (2006.01)

(52) U.S. Cl. .................. 715/744; 715/733; 715/765; 709/201

(58) Field of Classification Search .......... 715/716, 715/719, 733, 740–744, 747, 764, 765, 781; 709/200, 201, 217, 229
See application file for complete search history.

(56) References Cited

U.S. PATENT DOCUMENTS 7,334,720 B2 * 2/2008 Hulst et al. ............ 235/380
2002/0114465 A1 * 8/2002 Shen-Orr et al. ........ 380/231
2004/0107356 A1 * 6/2004 Shamoon et al. ........ 713/193
2005/0091338 A1 * 4/2005 de la Huerga ........... 709/217
2006/0031632 A1 * 2/2006 Moran et al. ........... 711/112
2006/0161635 A1 * 7/2006 Lamkin et al. ........... 709/217

* cited by examiner

*Primary Examiner*—X. L Bautista
(74) *Attorney, Agent, or Firm*—Martin L. McGregor

(57) ABSTRACT

A system and a method for information display that is well adapted to marketing in the current, rapidly changing digital transmission communications setting is described. The invention provides a viewer interface that can be embodied in an inexpensive portable information storage media, such as a compact disc, a mini-compact disc, a business card cut CD, a flash memory card, a DVD, or other such portable information storage devices. When the viewer interface is used with a communications link, such as an interne connection, the interface establishes a connection to an interface management program located on a remote computer. The interface management system enables the user who provided the portable information storage media for the viewer to control the content of the information displayed to the viewer, and change that content without modifying or storing any information on the viewer's display device or changing the content of the viewer interface.

20 Claims, No Drawings

INFORMATION DISPLAY SYSTEM

RELATED APPLICATIONS

This application is a continuation in part of provisional U.S. patent application Ser. No. 60/667,004 filed Mar. 31, 2005.

TECHNICAL FIELD

This invention provides methods and apparatus for displaying information to a viewer via a portable information storage media and when the viewer accesses a communications link, permits a user of the system to update the information provided to the viewer.

BACKGROUND OF THE INVENTION

Transfer of information between display devices is a rapidly expanding technology. Mass mailing of printed catalogues was for many years the method of choice for retailers to present their merchandise to the public. Today electronic marketers such as Amazon.com reach the world with frequently updated and searchable "catalogues" that are available by an international computer network popularly known as the internet. Digital transmission of information has produced an information explosion. Several methods have been developed for distribution of information by means of portable media as well as reception of digital information by both wired and wireless communications links. The internet service providers such as America On Line distribute compact discs (cd) with access programs to introduce potential new subscribers to their networks. When placed in a computer the cd will load a program that promotes the user to carry out the steps needed to find the appropriate local access number to connect to the internet service provider and then opens a "browser" to demonstrate the content available form the service provider. The same content is made available to all who use the distributed cd and there is no means for providing different content to different users. U.S. Pat. No. 6,760,918 discloses a system that uses portable media to provide a user with a media system which includes logic configured to provide a user interface that provides a user with a plurality of media content selections available at various times, and a portable client media drive configured to receive over a secured transmission medium the media content selected by the user of that system. U.S. Pat. No. 6,473,860 provides a method and system for distributing and processing digital information. The digital information is separated into two portions. The first portion is a clear portion and the second (residual) portion is encrypted. The clear and the encrypted portions are sent to a processing system that decrypts the encrypted portion. The clear and decrypted portion is combined to obtain a result that is substantially the same as the original digital information. In this system the clear portion is selected in a way to render the reconstruction of the original digital information difficult if the residual portion is not known. Thus, a customer will not be able to reconstruct the original digital information based on the clear portion. As a result, unauthorized use of the digital information is prevented. However neither of these patents, nor any other known to the inventor addresses the need for an inexpensive information distribution portable storage media wherein the information and interface components that are displayed are capable of being selectively updated and controlled by users of the system to deliver different information to selected groups of viewers that receive the information as well as the ability to change and control the interface components to create entirely different interfaces that perform different functions as well as have different purposes and do so in real time.

SUMMARY OF THE INVENTION

This invention relates to a system for information display that is well adapted to marketing in the current, rapidly changing digital transmission communications setting. The invention provides a viewer interface that can be embodied in an inexpensive portable information storage media, such as a compact disc, a mini-compact disc, a business card cut CD, a flash memory card, a DVD, or other such portable information storage devices. The viewer interface includes means to identify the party who provided the interface to the viewer. When the viewer interface is used with a communications link, the interface establishes a connection to an interface management program located on a remote computer. The interface management system enables the user who provided the portable information storage media for the viewer to control the content of the information displayed to the viewer, and change that content without modifying or storing any information on the viewer's display device or changing the content of the viewer interface. The system thus has three components that operate together to provide the information display system. There is a Portable Media Operating System with the viewer interface components stored in a portable information storage media, an interface management program called an "Interface Management Application", accessible by a communications link by remote display devices activated by the viewer interface and connected to a suitable communications network, and a user interface that permits a user to access the interface management program and change the information supplied to the viewer interface, thereby changing and controlling the display of information to the viewer. The instruction set that is utilized on the portable storage media is considered a "Portable Media Operating System" or "PMOS" and interacts with an "Interface Management Application" to gather the information about the content and components within the "PMOS" to display the desired content and layout of components that make up the interface. The "Interface Management Application" allows a user to create and store multiple interfaces within the "Interface Management Application" that can be utilized on the portable storage media so that they are able to change those interfaces in real time to meet their needs.

As an additional feature to the "Portable Media Operating System", custom instruction sets called "plug-ins" or "third party applications" can be created, by developers, that would run within the "Portable Media Operating System" allowing for a user, utilizing the "Interface Management Application", to access one of the "plug-ins" to have their "PMOS" portable storage media perform in a manner that was not even possible when they purchased the portable storage media licensing to begin with, making our "PMOS" the only instruction set designed to allow a user to continually upgrade an application that is currently installed or manufactured on portable storage media.

Another ability of the "Portable Media Operating System" is one that allows broad amounts of information from a broad number of locations to be combined and presented over a broadband connection. This form of "Broadcasting" allows the owner of the portable media to be able to transform that portable media into a broadcasting channel that, with the "Portable Media Operating System" can be utilized as a channel in which multiple broadcasting formats/interfaces are created to suit the type of content displayed or the desired effect in the format of an interface. These broadcasting formats/interfaces are then activated during a broadcast by any number of triggers such as but not limited to timing or scripting to allow for any type of content to be made available such as video, audio, text based data, images, presentations or any form of web based content.

The invention provides an information display system that comprises: An interface management program having a communications link available to potential viewers and configured to identify a user in response to a stored value communicated by a viewer interface and further configured to supply selected variables to a viewer interface as specified by an information display system user, having the following additional features: The interface management program enables a user to communicate with the interface management program and change a variable supplied to a viewer when the viewer connects to the interface management program by the communications link. The interface management program also enables the display of information to a viewer when the viewer communicates with the interface management program using the communications link. The system also includes a viewer interface embodied in a portable information storage media, called a "Portable Media Operating System", that recognizes a communications link to the interface management program, called an "Interface Management Application", when the viewer interface is activated by the viewer, communicates with the interface management program; supplies one or more stored values or one or more values provided by the viewer or, one or more values supplied by the viewer that identifies a user of the interface management program who provided the portable information storage media for that viewer and in response to a variable returned by the information management system, displays information to the viewer as selected by the user who supplied the viewer with the portable information storage media. Finally the system includes a user interface that is configured to communicate with an information display system interface management program and is further configured to permit a user to change a variable or variables that controls the information and format/interface displayed to a viewer when the viewer contacts the information system interface management program and supplies an identification value or values or, a value or values provided by the viewer that identifies the user who supplied the viewer with a portable information stored media comprising a viewer interface.

The invention is especially well adapted to marketing by those having information that changes rapidly and takes advantage of the low cost of producing large volumes of stored information in a machine readable format such as a compact disc or memory chip. The system enables for example a catalog that is always current to be distributed because the content is not stored on the card but on an updateable remote storage device that is accessed by the viewer interface, and the content displayed is provided and controlled from the remote computer. The user who distributes the catalog need only update the content of the single remote computer to update the information and interface that will be displayed to the viewers who received that catalog. Each user is linked to one or more identification codes that in turn identify specific viewer interfaces and/or enables providing a specific set of information to each such specific viewer interface.

It is also very well suited for the broadcast industry providing a much lower cost in broadcasting globally than currently possible as well as the ability to provide a rich media format that the current video layering techniques traditional broadcasting has used for years, limiting the ability for them to provide true rich media broadcasting.

In addition the operator of the information system is able to protect viewers against the typical hazards of using open communications networks such as the internet by licensing the "PMOS" with restrictions against particular types of content and monitoring the content presented through the viewer interface, something that is currently unable to be done with methods available today and by further providing a viewer communications link that reports when information has been extracted from or permanently stored on a viewer's display device and enables changing the information communicated to all viewers using a viewer interface that identifies the user who supplied the portable information storage media to the affected viewer to eliminate permanent storage of such information on display devices of other viewers having portable information storage media supplied by the identified information display system user.

DETAILED DESCRIPTION OF THE INVENTION

General Description of the Invention

The information display system provides the means for controlling and displaying data that preferably utilizes a remote server on a readily accessible communications network such as the internet and a form of portable information storage media (below "portable media") that will display features defined in the remote server through the application interface on the portable media described herein as the viewer interface. The remote server program called the information management application allows a user to define all aspects of the information displayed by the viewer interface on the portable media such as but not limited to data structure, visual aspects and functionality.

The remote server allows the user, having a proper user interface, to make a remote connection to:

a) choose from a pre-defined interface with pre-defined functions or;

b) define the interface and functions individually;

as well as define data structures in which they will also be able to add entries based on that defined data structure.

In a preferred embodiment a user would log in to the remote server and access the information display management program. The user would then be able to, using data entry forms, a graphical user interface and/or components, define the utilization of items such as but not limited to:

a) graphic components
   b) data components
   c) media components
   d) a method of initializing multiple functionalities such as but not limited to;
     1) search features
     2) commerce features
     3) media assets
     4) communication methods
     5) data display The user would have control over the above components in regards to:

a) location of the component within the display to the viewer interface
   b) size of the component within the display to the viewer interface
   c) assets the components will utilize such as, but not limited to, images, videos and data When the user has finished defining the component information, data structures, functionality, and the like, on the remote server they are able to save that data and refer back to that definition by the name under which they saved it, allowing them to update aspects of the definition whenever the user desires that the information be updated. Allowing the user to define several sets of data definitions under different names enables the users to choose what set of data will control what is seen and the functionality of the viewer application interface on the portable media as well as switch between the different definitions smoothly providing the defined data in real time to the viewer.

Using the portable media in a computer or portable display devices such as but not limited to a personal data assistant, laptop or cellular telephone would allow a viewer to see the defined data through the viewer application interface on the portable media. The viewer interface stored in the portable media detects the presence of an internet connection and sends information to the server such as but not limited to:

a) a users ID information that the viewer inputs and/or;
    b) a users ID information that is programmed in to the application interface.

This users ID information allows the remote server to send the proper data definition back to the specific viewer's display device, which stores the definition in a temporary location on the viewer's display device as well as any data files utilized in the definition such as, but not limited to, images, video and audio files. The definition is then used to control aspects of the interface such as, but not limited to:

a) the look of the interface
    b) functionality of the interface
    c) the data that is presented to the viewer such as, but not limited to:
        a. database listings
        b. product line information
        c. portfolio data and images
        d. company data
    d) assets presented in the interface such as, but not limited to:
        e. images
        f. video files
        g. audio files These interface controls could be utilized for things such as, but not limited to:

a) the layout of the interface
    b) as support assets for individual entries in the data definition
    c) presentation assets
    d) commerce functionality
    e) timing the interface/format alterations When the application interface is closed on the viewer's display device, the temporary files that are used in the application interface are then deleted, leaving nothing on the viewer's display device. If no connection to the remote server can be reached from the viewer's display device, a predefined layout may be programmed within the application interface, to be shown to the viewer, allowing an application interface on the portable media to function without a connection to the remote server and allowing the viewer to obtain predefined data about the user. This display may include information directing the viewer to connect to a suitable communications link, and provide other contact information or a connection to any traditional form of application that can be found currently on portable storage media.

The viewer application interface that is on the portable media also allows a form of controlling the Internet based content that is displayed to the viewer, helping to insure a safer form of viewing Internet content then currently available. This level of control is implemented at the remote server level, providing the ability to prevent any user from defining content that could be considered offensive or malicious material within the application interface that is on the portable media.

No aspect of using the "PMOS" on the portable media requires any programs, plug-ins, scripts or the like to be installed on the viewers computer for the viewer to benefit from the data or safety provided in the application interface on the portable media. The "PMOS" also provides the ability for a user to include web based content or assets within the "PMOS" that would perform a particular function and allow for the installation of third party applications and plug-ins if needed for the required function.

The Portable Media Operating System that is utilized on the portable media is also able to be used to create a broadcasting channel that, with a different set of controls in the Interface Management Application, provides potentially an unlimited number of broadcasting channels that are able to present or "Broadcast" all forms of media from text to video.

The digital data and format read by the Portable Media Operating System allows the user to create, manipulate and control the format of the channel interface during a broadcast without any user intervention, if desired. It is obvious that to help viewers reduce the number of portable information media storage they would need to have all their favorite channels with them wherever they go, the need to create a portable media information storage device that would allow for the ability to store multiple channels in one location for easy access and management is required the more popular the technology gets. A portable media storage device that would provide this function could also allow the viewer who has the ability to be connected to a suitable communications link such as but not limited to a wireless hot spot or on their home network, they will be able to view the channel without having to carry a stack of portable media around.

When portable media with the Portable Media Operating System on it is utilized in the portable information storage media device the viewer is able to create a channel from that portable media by utilizing the configuration information on the portable media that is used to run the Portable Media Operating System. By being connected to a suitable communications link, the Portable Media Operating System that is on the portable information storage media device can be updated to always provide the latest version of the Portable Media Operating System no matter how long ago the portable media was manufactured that was placed into the portable information storage media device or when the channel was created in the portable media storage device itself.

Every aspect of this channel would be controlled by the user that provided the particular portable media such as but not limited to advertisement costs or whether it will be used for public use or used as an inter-office channel that companies could utilize for business reasons such as but not limited to:

a) Human Resources updates
    b) Handbook updates
    c) Company calendar
    d) Company resources The portable media storage device is also a multi-functional device that provides the standard features that a person might expect to be included in a typical media center such as but not limited to:

a) an MP3 player
    b) a video player
    c) a DVD player
    d) a CD player
    e) a Digital Video Recorder (DVR)
    f) Digital Chip (Card) Reader such as but not limited to SD chips by SanDisk®

The portable media storage device could also include other standard technologies such as but not limited to:
a) Bluetooth technology
b) Video conferencing
c) 3D Technology
d) Voice Over Internet Protocol (VOIP) technology
e) Internet technologies The portable media storage device would also provide an array of input as well as output connections for various media and device types such as but not limited to:
a) RCA
b) Ethernet
c) Wireless
d) Coaxial Cable
e) HD
f) USB Additional peripherals could be made available to make accessing the channels in the portable media storage device simpler and/or enhance the abilities of the portable media storage device such as but not limited to:
a) Video cameras
b) Televisions
c) Radios
d) Channel Arrays
e) Game Controllers
f) Mass Media Storage The controls provided in the Interface Management Application for the broadcast channel provide the user with the ability to create several formats, each can present a group of assets made up from several forms of content such as. but not limited to:
a) Video
b) Typical web based content
c) Audio
d) Images to allow a user the ability to structure the interface to meet the needs of the assets they are providing at the time. This differs from the traditional broadcasting format in the aspect that they utilize video layering technologies to provide content from multiple sources to the viewer.

Broadcasting through the Portable Media Operating System also differs from the traditional broadcasting format in the aspect that the viewer has the ability to interact with the broadcast in real time for things such as pause, play and rewind as well as many other reasons such as, but not limited to:
a) Read and/or print the text based content that is being presented at the time
b) Save different assets presented in the broadcasting channel to the portable media storage device such as, but not limited to:
  a. Video
  b. Audio
  c. Images
  d. Software
c) Save different assets presented in the broadcasting channel to a computer or network storage device such as, but not limited to:
  a. Video
  b. Audio
  c. Images
  d. Software
d) Save different assets presented in the broadcasting channel to a writeable form of portable media such as, but not limited to:
  a. USB drive
  b. Memory Chip
  c. DVD
  d. CD
e) Triggers can be established within each broadcasting format that tells the Portable Media Operating System when to change broadcasting formats as well as what components are needed in that format at the appropriate moment based on methods such as, but not limited to:
  a. Main video timeline
  b. Main audio timeline
  c. Scripted triggered events
  d. User Interaction
  e. Timed events
f) The broadcasting channel is viewable in a display device utilizing the portable storage media itself, to promote the portable media storage device, or in full scale for a business model that is not based on a portable media storage device but rather a software package on portable storage media that provides the same features.

The Portable Media Operating System may also be designed to support the sale of a scaled down version of the portable media storage device that would be considered a player/recorder that a person could connect to a display device to get the same type of functionality described above from the display device based player/recorder utilizing a software package that comes with the player/recorder and the hardware already in the viewers computer.

The Interface Management Application can also be updated through a display device based interface utilizing a stand alone application installed on the users computer to help provide a better method of control in delegating the tasks needed to maintain the "PMOS".

As another delivery method the entire media storage device can be scaled down to a software package delivered on portable media that, providing one has the equipment in a display device, one can do all the same things the portable media storage device can do, described above.

The flexibility of the "PMOS" allows controls to be created in the "Interface Management Application" to meet the needs of any industry for any reason. The ability to utilize instruction sets, created after the development of the "PMOS", within the "PMOS" itself provides the ability for the "PMOS" to meet any programmatic custom need request by a user no matter what that programmatic need may be. Alternatively the portable media may include utilizing Radio Frequency (RF) technology manufactured in to the portable media which would allow for that portable media to be utilized as a stored value card, banking card, credit card and the like. The ability for a viewer to be able to take the portable media with them as some form of stored value membership program is only one aspect of the benefit. A viewer could also use the media to store digital files as well as interact with the PMOS in the fashion designed by the user supplying the portable media.

To avoid doubt the reader is advised that wherever the term "user" is used herein reference is made to the party having control of content stored in a portable information storage device and of the content stored or referenced on the remote server to be supplied when the portable media operating system connects to the server. The term "viewer" means the end user of the portable information storage media, the viewer is the person who activates the portable media operating system in an environment having a communications link to a remote server or runs from the viewers display device.

In an alternative embodiment the invention may be considered as a method for information display that comprises:

1) Providing an interface management program having a communications link available to potential viewers and configured to identify a user in response to a stored value communicated by a viewer interface and further configured to supply selected variables to a viewer interface as specified by an information display system user, having the following additional features;
   i. The interface management program enables a user to communicate with the interface management program and change a variable supplied to a viewer when the viewer connects to the interface management program by the communications link;
   ii. The interface management program enables the display of information to a viewer when the viewer communicates with the interface management program using the communications link; and
2) Providing a viewer interface embodied in a portable information storage media that comprises a portable media operating system that recognizes a communications link to the interface management program when the viewer interface is activated by the viewer, communicates with the interface management program; supplies a stored value or a value provided by the viewer that identifies a user of the interface management program who provided the portable information storage media for a viewer and in response to a variable returned by the information management system, displays information to the viewer as selected by the user who supplied the viewer with the portable information storage media; and
3) Providing a user interface that is configured to communicate with an information display system interface management program and is further configured to permit a user to change a variable that controls the information displayed to a viewer when the viewer contacts the information system interface management program and supplies a stored value or a value provided by the viewer that identifies the user who supplied the viewer with a portable information stored media comprising a viewer interface.

The method for information display preferably further comprises providing a viewer communications link that reports when information has been extracted from or permanently stored on a viewer's display device and enables changing the information communicated to all viewers using a viewer interface that identifies the user who supplied the portable information storage media to the affected viewer to eliminate permanent storage of such information on display devices of other viewers having portable information storage media supplied by the identified information display system user. The method for information display may also include providing a user interface that enables use of one or more function selected from the group consisting of using data entry forms, supplying graphical user interface components, and defining the utilization of items. In a preferred embodiment the method for information display further comprises the function of defining utilization of items selected from the group consisting of:
   a) graphic components
   b) data components
   c) media components
   d) initializing multiple functionalities.

The method for information display may include the multiple functionalities selected from the group consisting of:
   1) search features
   2) commerce features
   3) media assets
   4) communication methods, and
   5) data display.

A preferred method for information display provides a viewer interface embodied in a portable information storage media further comprises a predefined layout programmed within the viewer interface, to be shown to the viewer in the event that a communications link with the server is not detected, that allows the viewer interface on the portable media to function without a connection to the remote server and allowing the viewer to obtain predefined data about the user stored in the portable information storage media. A preferred method for information display provides portable media operating system is utilized to create a broadcasting channel as discussed above.

The invention also provides an alternative method for controlling the content of an information display system comprising providing an interface management program having a communications link available to potential viewers and configured to identify a user in response to a stored value or a value provided by the viewer communicated by a viewer interface and further configured to supply selected variables to a viewer interface as specified by an information display system user, having the following additional features:
   i. the interface management program enables a user to communicate with the interface management program and change a variable supplied to a viewer when the viewer connects to the interface management program by the communications link;
   ii. the interface management program enables the display of information to a viewer when the viewer communicates with the interface management program using the communications link.

A preferred method of this embodiment for controlling the content of an information display system further comprises controls for a broadcast channel to provide the user with the ability to create several formats, each can present an asset selected from the group consisting of:
   1. Video
   2. Typical web based content
   3. Audio, and
   4. Images.

An especially preferred method for controlling the content of an information display system further comprises controls enabling the use of one or more function selected from the group consisting of using data entry forms, supplying graphical user interface components, and defining the utilization of items. Preferably the method for controlling the content of an information display system further comprises the function of defining utilization of items selected from the group consisting of:
   a) graphic components
   b) data components
   c) media components
   d) initializing multiple functionalities.

In a preferred embodiment of the method for controlling the content of an information display system, the multiple functionalities are selected from the group consisting of:
   1) search features
   2) commerce features
   3) media assets
   4) communication methods, and
   5) data display.

An alternative method for controlling the content of an information display system comprises providing a portable information storage media that comprises a viewer interface that comprises a portable media operating system that recognizes a communications link to an interface management program when the portable information storage media is activated by the viewer, the portable media operating system communicates with the interface management program; supplies a stored value or a value provided by the viewer that identifies a user of the information display system interface management program who provided the portable information storage media for the viewer activating the portable information storage media and in response to variables returned by the interface management system displays information to the viewer as selected by the user who supplied the viewer with the portable information storage media. This method for controlling the content of an information display system preferably comprises a portable media operating system configured to permit a viewer to perform a function selected from the group consisting of:

a. Read and/or print the text based content that is being presented at the time.
   b. Save different assets presented in a broadcasting channel to the portable media storage device;
   c. Save different assets presented in the broadcasting channel to a computer or network storage device;
   d. Save different assets presented in the broadcasting channel to a writeable form of portable media;
   e. Activate Triggers established within a broadcasting format that tells the Portable Media Operating System when to change broadcasting formats as well as what components are needed in that format at the appropriate moment based on methods.

A preferred method for controlling the content of an information display system further comprises a portable media operating system configured to detect the presence of an internet connection and sends information to a predefined server: The method may also provide portable media operating system that sends information to the predefined server selected from the group consisting of:

a. a users ID information that the viewer inputs and/or;
   b. a users ID information that is programmed in to the application interface.

Another alternative method for controlling the content of an information display system comprises providing a portable media storage device configured to store and manage a plurality of portable information storage media as described above. Preferably the method provides a multi-functional device that includes one or more of the following components:

1. an MP3 player
   2. a video player
   3. a DVD player
   4. a CD player
   5. a Digital Video Recorder (DVR)
   6. Digital Chip Reader
   7. a Bluetooth interface
   8. A Video conferencing interface
   9. A 3D Technology interface
   10. A Voice Over Internet Protocol (VOIP) interface This alternative method for controlling the content of an information display system preferably further comprises input and output connections which maybe selected from the group consisting of 1. RCA pin plugs
   2. Ethernet
   3. Wireless
   4. Coaxial Cable
   5. HD and
   6. USB The invention also encompasses each of the unique items set out as provided by the preceding methods. The examples set out above are intended to illustrate the invention and not as limitations. Those skilled in the art will recognize that there are many alternative methods and items that can may be employed with the scope of the claims set out below to practice the claimed invention.

I claim:

1. An information display system that comprises:
   1) An interface management program having a communications link available to potential viewers and configured to identify a user in response to a stored value communicated by a viewer interface and further configured to supply selected variables to a viewer interface as specified by an information display system user, having the following additional features;
     i. The interface management program enables a user to communicate with the interface management program and change a variable supplied to a viewer when the viewer connects to the interface management program by the communications link;
     ii. The interface management program enables the display of information to a viewer when the viewer communicates with the interface management program using the communications link; and
   2) A viewer interface embodied in a portable information storage media that comprises a portable media operating system that recognizes a communications link to the interface management program when the viewer interface is activated by the viewer, communicates with the interface management program; supplies a stored value or a value provided by the viewer that identifies a user of the interface management program who provided the portable information storage media for a viewer and in response to a variable returned by the information management system, displays information to the viewer as selected by the user who supplied the viewer with the portable information storage media; and
   3) A user interface that is configured to communicate with an information display system interface management program and is further configured to permit a user to change a variable that controls the information displayed to a viewer when the viewer contacts the information system interface management program and supplies a stored value or a value provided by the viewer that identifies the user who supplied the viewer with a portable information stored media comprising a viewer interface.

2. An information display system according to claim 1 that further comprises a viewer communications link that reports when information has been extracted from or permanently stored on a viewer's display device and enables changing the information communicated to all viewers using a viewer interface that identifies the user who supplied the portable information storage media to a viewer to eliminate permanent storage of such information on display devices of other viewers having portable information storage media supplied by the identified information display system user.

3. An information display system according to claim 1 that further comprises a user interface that enables use of one or more function selected from the group consisting of using data entry forms, supplying graphical user interface components, and defining the utilization of items.

4. An information display system according to claim 3 that further comprises the function of defining utilization of items selected from the group consisting of:

a) graphic components
b) data components
c) media components
d) initializing multiple functionalities.

5. An information display system according to claim 4 wherein the multiple functionalities are selected from the group consisting of:
   1) search features
   2) commerce features
   3) media assets
   4) communication methods, and
   5) data display.

6. An information display system according to claim 1 wherein the viewer interface embodied in a portable information storage media further comprises a predefined layout programmed within the viewer interface, to be shown to the viewer in the event that a communications link with the server is not detected, that allows the viewer interface on the portable media to function without a connection to the remote server and allowing the viewer to obtain predefined data about the user stored in the portable information storage media.

7. An information display system according to claim 1 wherein the portable media operating system is utilized to create a broadcasting channel.

8. A portable information storage media comprising an interface management program for controlling the content of an information display system having a communications link available to potential viewers and configured to identify a user in response to a stored value or a value provided by the viewer communicated by a viewer interface and further configured to supply selected variables to a viewer interface as specified by an information display system user, having the following additional features:
   i. the interface management program enables a user to communicate with the interface management program and change a variable supplied to a viewer when the viewer connects to the interface management program by the communications link;
   ii. the interface management program enables the display of information to a viewer when the viewer communicates with the interface management program using the communications link.

9. A portable information storage media according to claim 8 that further comprises controls for a broadcast channel to provide the user with the ability to create several formats, each can present an asset selected from the group consisting of:
   1. Video
   2. Typical web based content
   3. Audio, and
   4. Images.

10. A portable information storage media interface management according to claim 8 that further comprises controls enabling the use of one or more function selected from the group consisting of using data entry forms, supplying graphical user interface components, and defining the utilization of items.

11. A method for information display that comprises:
   1) Providing an interface management program having a communications link available to potential viewers and configured to identify a user in response to a stored value communicated by a viewer interface and further configured to supply selected variables to a viewer interface as specified by an information display system user, having the following additional features:
      i. The interface management program enables a user to communicate with the interface management program and change a variable supplied to a viewer when the viewer connects to the interface management program by the communications link;
      ii. The interface management program enables the display of information to a viewer when the viewer communicates with the interface management program using the communications link; and
   2) Providing a viewer interface embodied in a portable information storage media that comprises a portable media operating system that recognizes a communications link to the interface management program when the viewer interface is activated by the viewer, communicates with the interface management program; supplies a stored value or a value provided by the viewer that identifies a user of the interface management program who provided the portable information storage media for a viewer and in response to a variable returned by the information management system, displays information to the viewer as selected by the user who supplied the viewer with the portable information storage media; and
   3) Providing a user interface that is configured to communicate with an information display system interface management program and is further configured to permit a user to change a variable that controls the information displayed to a viewer when the viewer contacts the information system interface management program and supplies a stored value or a value provided by the viewer that identifies the user who supplied the viewer with a portable information stored media comprising a viewer interface.

12. A method for information display according to claim 11 that further comprises providing a viewer communications link that reports when information has been extracted from or permanently stored on a viewer's display device and enables changing the information communicated to all viewers using a viewer interface that identifies the user who supplied the portable information storage media to a viewer to eliminate permanent storage of such information on display devices of other viewers having portable information storage media supplied by the identified information display system user.

13. A method for information display according to claim 11 that further comprises providing a user interface that enables use of one or more function selected from the group consisting of using data entry forms, supplying graphical user interface components, and defining the utilization of items.

14. A method for information display according to claim 13 that further comprises the function of defining utilization of items selected from the group consisting of:
   a) graphic components
   b) data components
   c) media components
   d) initializing multiple functionalities.

15. A method for information display according to claim 14 wherein the multiple functionalities are selected from the group consisting of:
   1) search features
   2) commerce features
   3) media assets
   4) communication methods, and
   5) data display.

16. A method for information display according to claim 11 wherein the viewer interface embodied in a portable information storage media further comprises a predefined layout programmed within the viewer interface, to be shown to the viewer in the event that a communications link with the server is not detected, that allows the viewer interface on the portable media to function without a connection to the remote server and allowing the viewer to obtain predefined data about the user stored in the portable information storage media.

17. A method for information display according to claim 11 wherein the portable media operating system is utilized to create a broadcasting channel.

18. A method for controlling the content of an information display system comprising providing an interface management program having a communications link available to potential viewers and configured to identify a user in response to a stored value or a value provided by the viewer communicated by a viewer interface and further configured to supply selected variables to a viewer interface as specified by an information display system user, having the following additional features:

i. the interface management program enables a user to communicate with the interface management program and change a variable supplied to a viewer when the viewer connects to the interface management program by the communications link;

ii. the interface management program enables the display of information to a viewer when the viewer communicates with the interface management program using the communications link.

19. A method for controlling the content of an information display system according to claim 18 that further comprises controls for a broadcast channel to provide the user with the ability to create several formats, each can present an asset selected from the group consisting of:
   1. Video
   2. Typical web based content
   3. Audio, and
   4. Images.

20. A method for controlling the content of an information display system according to claim 18 that further comprises controls enabling the use of one or more function selected from the group consisting of using data entry forms, supplying graphical user interface components, and defining the utilization of items.

* * * * *